United States Patent [19]

Maruo

[11] 4,402,635
[45] Sep. 6, 1983

[54] PNEUMATIC CONVEYOR SYSTEM

[75] Inventor: Toshio Maruo, Tokorozawa, Japan

[73] Assignee: Nisshin Flour Milling Co., Ltd., Tokyo, Japan

[21] Appl. No.: 285,280

[22] Filed: Jul. 20, 1981

[30] Foreign Application Priority Data

Jul. 21, 1980 [JP] Japan ................................. 55/99686
Jul. 21, 1980 [JP] Japan ................................. 55/99687

[51] Int. Cl.$^3$ ............................................. B65G 53/66
[52] U.S. Cl. ..................................................... 406/14
[58] Field of Search ......................................... 406/14

[56] References Cited

U.S. PATENT DOCUMENTS 4,014,577 3/1977 Clancy et al. .......................... 406/14
4,318,643 3/1982 Larsson et al. ........................ 406/14

Primary Examiner—Jeffrey V. Nase
Assistant Examiner—L. E. Williams
Attorney, Agent, or Firm—Frishauf, Holtz, Goodman and Woodward

[57] ABSTRACT

In a pneumatic conveyor system comprising a plurality of parallel transport pipes and a blower for passing air through the pipes at a high velocity to transport particulate solids, each of the transport pipes is provided with a flow regulator. The flow regulator in a first embodiment is a manual flow regulator which is preset to a predetermined airflow and allows fine adjustment in response to a variation of particulate-air ratio to keep the airflow constant. The flow regulator in a second embodiment cooperates with a process control computer so as to provide the air stream through each pipe with an optimum air flow velocity. Air flows at a rate sufficient to transport particulate solids at varying particulate-air ratios, reducing the capacity of a blower as well as saving power comsumption.

16 Claims, 5 Drawing Figures

PNEUMATIC CONVEYOR SYSTEM

BACKGROUND OF THE INVENTION

This invention relates to a multi-pipe pneumatic conveyor system wherein particulate material is transported through a plurality of parallel pipes by means of a high velocity airstream.

A pneumatic conveyor system having a main pipe and a plurality of parallel branch pipes is well known in the art. In such a system, the airflow or air volume through each branch pipe is initially set to a predetermined value by adjusting a damper inserted intermediate the pipe. The system is operated with the damper fixed. The amount of particulate solids to be transported through each branch pipe actually varies over a wide range and this variation works a change in airflow through each pipe. An empirical analysis is previously made to determine a sufficient airflow to provide an air velocity capable of pneumatically transporting particulate solids at the maximum particulate-to-air ratio which is expected to occur in each pipe before the damper is set so as to establish the predetermined airflow. Accordingly, the predetermined airflow is considerably larger than the airflow required for the normal operation where the mixing ratios are uniform in all the branch pipes. The actual mixing ratio in each branch pipe is considerably lower than the maximum expected mixing ratio so that an excess of the air volume flows in vain, increasing power consumption and pipe wear. Since the blower must have an excessive capacity to provide an excessive airflow, not only initial investment, but also operating cost are increased. Furthermore, if the airflow through one branch pipe is extremely increased, the airflow through each of the remaining branch pipes is relatively reduced, and then particulate solids can stagnate in the pipes with increasing particulate-to-air ratios and in the worst case, choke one or more pipes. As described above, the conventional pneumatic conveyor system has the shortcomings that the designed capacity is excessive and troubles often occur.

It is, therefore, an object of the present invention to provide a pneumatic conveyor system wherein the airflow through each branch pipe is kept constant to ensure stable operation.

It is another object of the present invention to provide a controlled pneumatic conveyor system which is operated at an optimum air velocity.

It is a further object of the present invention to reduce the initial investment and operating cost of a pneumatic conveyor system.

SUMMARY OF THE INVENTION

According to the present invention, a pneumatic conveyor system includes a plurality of branch pipes each of which is provided with flow regulator means for keeping the airflow thereacross constant by responding to a pressure variation caused by a change of mixing ratio so that an air stream flows through each branch pipe at a constant flow rate independent of a varying mixing ratio.

According to a second aspect of the present invention, a pneumatic conveyor system for transporting particulate solids through a plurality of pipes by passing air therethrough is controlled by detecting a static pressure at any suitable point or a differential pressure between any suitable two points in each pipe, supplying a signal representative of the static or differential pressure to the input of controller means such as a process control computer, and actuating airflow regulator means in each pipe in accordance with the control signal of the controller means. The controller means cooperates with the regulator means to achieve an airflow sufficient to minimize the static or differential pressure, that is, an optimum air velocity. The system is then controlled to operate at the minimum necessary air velocity irrespective of a change in particulate-to-air ratio.

BRIEF DESCRIPTION OF THE DRAWING

Other features and advantages of the invention will become apparent from the following description of embodiments with reference to the accompanying drawings in which.

DESCRIPTION OF THE PREFERRED EMBODIMENTS

Figure 1:
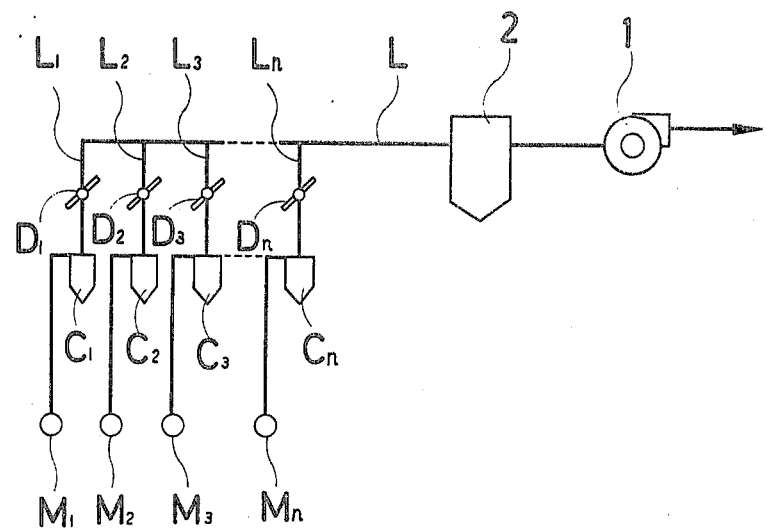
FIG. 1 is a diagram of a prior art pneumatic conveyor system.

Referring to FIG. 1, a typical prior art pneumatic conveyor system of the suction type is shown. Of course, the pneumatic conveyor system to which the present invention is applied may also be of the pressure type. The system is shown as comprising a main pipe L including a suction blower 1 at the downstream end and a bag filter 2 upstream of the blower. The main pipe L divides into a plurality of parallel branch pipes $L_1$, $L_2$, $L_3$, ..., $L_n$ which include a corresponding plurality of feeders $M_1$, $M_2$, $M_3$, ..., $M_n$ and cyclone separators $C_1$, $C_2$, $C_3$, ..., $C_n$, respectively. The branch pipes also include a corresponding plurality of dampers $D_1$, $D_2$, $D_3$, ..., $D_n$ located downstream of the cyclone separators for regulating the airflow thereacross. Particulate solids are introduced into a branch pipe via the associated feeder at a suitable particulate-to-air ratio. The particulate-carrying air stream is moved forward through the branch pipe by pressure of vacuum generated by the suction blower 1. The air stream flows into the cyclone separator where the particulates are substantially separated and then the air stream advances into the bag filter 2 where the dust or finer particulates are removed before the air is exhausted from the system. A certain flow rate or velocity of air is necessary in order to pneumatically transport particulate solids, which depends on the physical properties of the particulate solids, for example, particle size and shape, adhesion, hygroscopicity and the like as well as particulate-to-air mixing ratio. In addition, the mixing ratio continuously varies over a relatively wide range. At present, the degree of opening of the damper, that is, the airflow Q required to provide the necessary velocity of carrier air is set on the basis of the maximum expected mixing ratio. However, the actual mixing ratio in each branch pipe is usually lower than the maximum ratio and an excess of air is consumed in vain without serving to carry particulate solids. If one branch pipe, for example, branch pipe $L_n$, receives an increased amount of particulate solids from the associated feeder $M_n$ and hence, experiences an increased particulate-to-air ratio, the airflow in this branch pipe is reduced and the excessive air volume is distributed over the remaining branch pipes $L_1, L_2, \ldots, L_{n-1}$ through which air would flow more easily. The excessive air volume distributed over these branch pipes continues to flow in vain without any interference by the dampers. If the mixing ratio is further increased, the above phenomenon would be further enhanced to preclude the transport of particulate solids, sometimes resulting in choking of the branch pipe $L_n$. This is because the dampers are set such that the air volume to flow the branch pipe $L_n$ is readily distributed to the remaining pipes.

Figure 2:
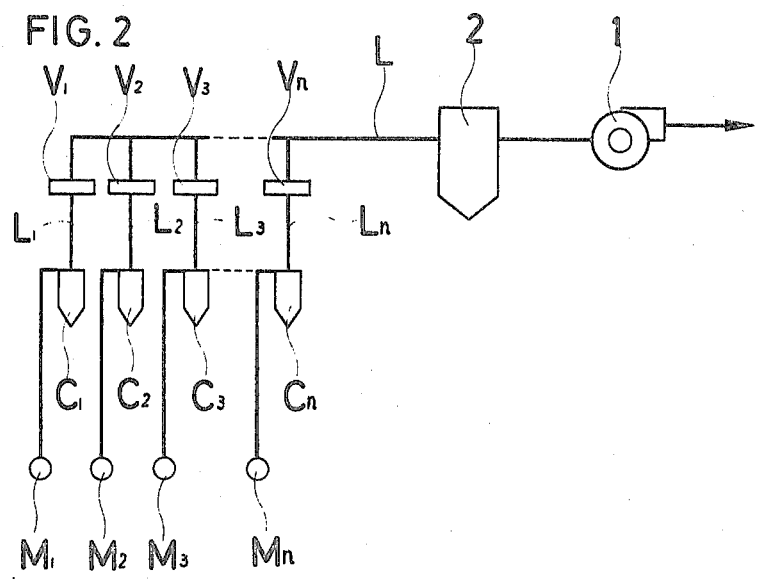
FIG. 2 is a diagram showing one embodiment of the pneumatic conveyor system according to the present invention.
Figure 3:
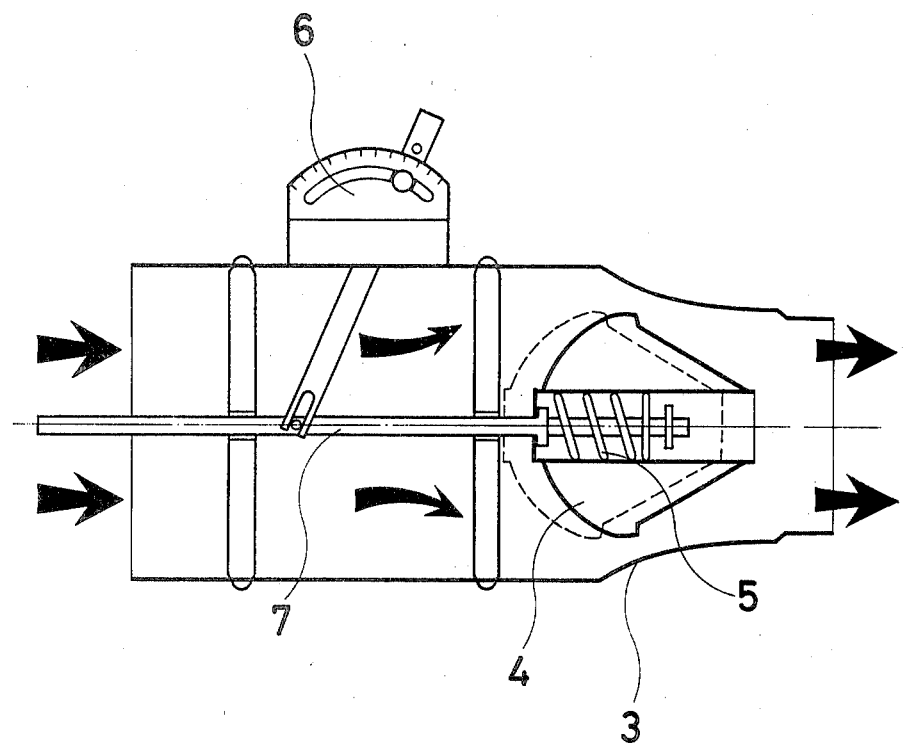
FIG. 3 is a cross-sectional view of an exemplary airflow regulator used in the system of FIG. 2.

According to a first embodiment of the present invention as illustrated in FIG. 2, the branch pipes are provided downstream of the cyclone separators with airflow regulator means $V_1, V_2, V_3, \ldots, V_n$ for keeping the airflow thereacross constant in place of the dampers, respectively. One example of the airflow regulator means which can be used herein is illustrated in FIG. 3. The regulator illustrated in FIG. 3 comprises a Venturi-shaped housing 3 having an upstream or left end and a downstream or right end connected intermediate the branch line. In the housing 3, a conical member 4 having a central axial bore is mounted for axial elastic motion on a rod 7 extending into the central bore, by means of a spring 5. More particularly, one end of the spring 5 is affixed to the downstream end of the rod and the other end is affixed to the upstream opening edge of the bore. The conical member 4 is biased toward the upstream by the spring 5 and allowed to move toward the downstream when pressure is applied thereto. A portion of the housing 3 which circumferentially surrounds the cone is converged. The rod 7 is mounted for axial motion in holes of diametrically extending support members secured to the housing 3. Adjusting means 6 includes a link 8 which is pivotally mounted to a bracket on the housing (not shown). The link 8 has at one end a forked end engaging a pin on the rod 7, and it has at the other end a pin penetrating through an arcuate channel in a panel of the adjusting means 6. The position of the conical member 4 is adjustable by the adjusting means by way of the link 8 and the rod 7. As the air velocity through the pipe or housing is accelerated in the direction shown by arrows or as the pressure of an air stream is increased, the conical member 4 is moved to the right position shown by solid lines in FIG. 3 through compression of the spring 5 to reduce or throttle the space between the conical member and the housing to increase the resistance to the air stream, thereby reducing the air volume. On the contrary, as the air velocity is decelerated or as the air pressure is decreased, the spring 5 expands to move the conical member 4 to the left position shown by dotted lines to increase the space between the conical member and the housing to reduce the resistance to the air stream, thereby increasing the air volume. By providing the branch pipes $L_1, L_2, L_3, \ldots, L_n$ with the constant airflow regulator means, respectively, the system can be controlled such that a given airflow $Q'$ is always maintained through each pipe. The inventors have experimentally found that the given airflow $Q'$ is about 20-30% smaller than the airflow $Q$ required for the conventional pneumatic conveyor system. As a result, the blower may be of a smaller capacity, the air capacity may also be reduced, and the operating cost or power consumption may be reduced by about 20-30%.

Figure 4:
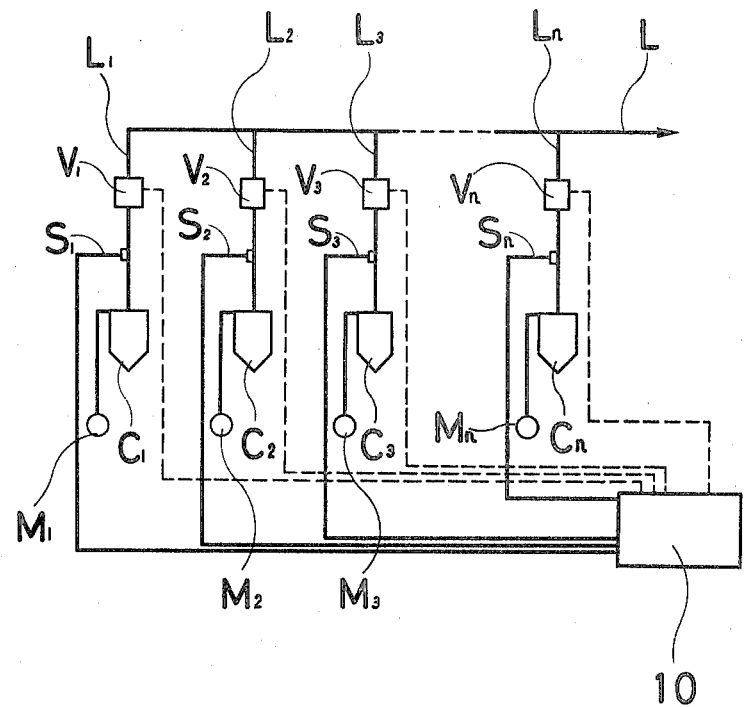
FIG. 4 is a diagram showing another embodiment of the pneumatic conveyor system according to the present invention.

According to a second embodiment of the present invention, as shown in FIG. 4, the branch pipes $L_1, L_2, L_3, \ldots, L_n$ are provided downstream of the cyclone separators with flow regulator means $V_1, V_2, V_3, \ldots, V_n$ in place of the dampers, respectively. As described below, these flow regulator means are computer controlled so as to provide an optimum airflow $Q'$.

As shown in FIG. 4, the branch pipes include detectors $S_1, S_2, S_3, \ldots, S_n$ located between the cyclone separators and the flow regulator means for detecting a static pressure at any suitable point or a differential pressure between any suitable two points in the pipes. A static or differential pressure signal detected by the detector is supplied to the input of controller means 3 such as a process control microcomputer. The controller means is capable of arithmatic operation to develop a control signal designed to reduce the static or differential pressure to the minimum, that is, to provide an optimum air flow velocity. THe control signal is transmitted through a line depicted by broken lines in FIG. 4 to an actuator 9 to adjust the flow regulator means.

Figure 5:
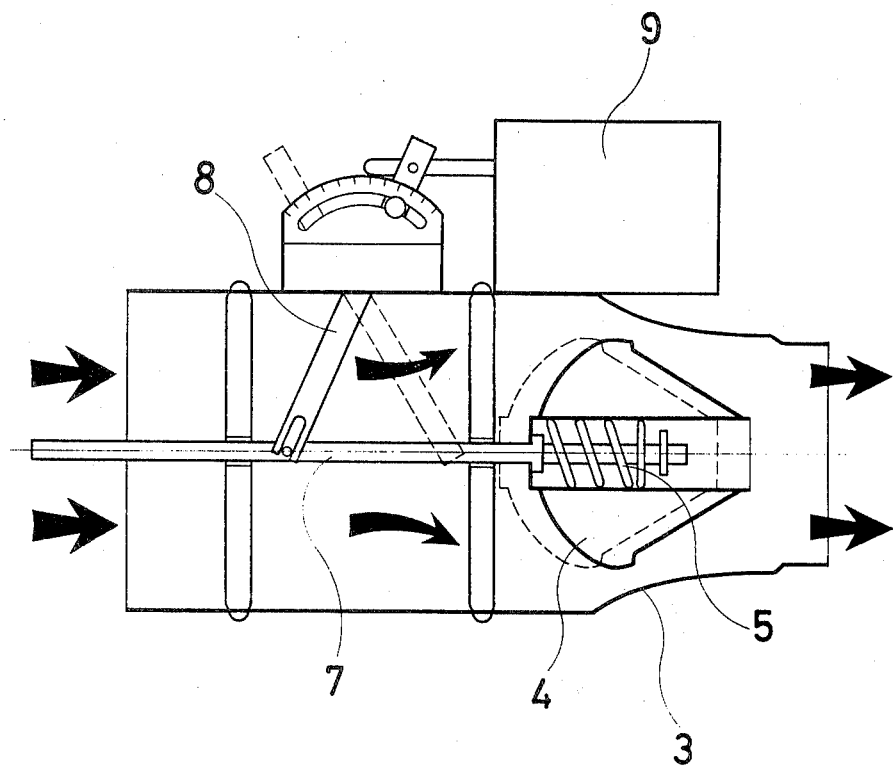
FIG. 5 is a cross-sectional view of an exemplary airflow regulator used in the system of FIG. 4.

An example of the flow regulator means which may be used herein is illustrated in FIG. 5. The regulator means comprises a Venturi-shaped housing 3 in which a conical member 4 is mounted for elastic motion on a rod 7 by means of a spring 5.

The rod 7 is connected to a link 8 which is connected to the actuator 9 which is electrically connected to the controller means 3. The actuator 9 functions to move the link 8 in a swing manner from the maximum to the minimum flow rate position in accordance with the control signal from the controller means, and the conical member 4 is accordingly moved in the axial direction of the rod 7. In addition, as the velocity of an air stream shown by arrows is accelerated or as the pressure of an air stream is increased, the conical member 4 is moved to the right position shown by solid lines in FIG. 5 through compression of the spring 5 to reduce or throttle the space between the conical member and the housing, thereby increasing the resistance to the air stream and reducing the airflow. On the contrary, as the air velocity is decelerated or as the air pressure is decreased, the spring 5 expands to move the conical member 4 to the left position shown by broken lines in FIG. 5 to increase the space between the cone and the housing, thereby reducing the resistance to the air stream and increasing the airflow.

While a portion of the air volume is wasted in the conventional pneumatic conveyor system, such an excessive air volume may be saved by means of the airflow regulator means according to the present invention. The damper is set to an excessive value in the conventional pneumatic conveyor system as the damper opening is determined on the basis of the maximum expected mixing ratio. The conventional system cannot provide a resisting or assisting function to an air stream in response to the acceleration or deceleration thereof as achieved by the airflow regulator means of the present invention. The system of the present invention can accommodate varying loads and provide a constant airflow for the normal operation which is significantly reduced in comparison with the airflow set on the basis of the maximum expected mixing ratio in the conventional system. Accordingly, the capacity of a blower used as an air source of the system may be reduced, the operating cost of the system, particularly power consumption may be remarkably reduced, and the maintenance cost of the system may also be reduced due to reduced wear of the pipes.

These advantages are not obtained in the system where the airflow is set to a predetermined value by means of a damper. The present invention is effective particularly in saving power and enables the stable operation of a pneumatic conveyor system at low energy consumption.

According to the second embodiment of the present invention, an airflow Q' sufficient to provide an optimum air velocity is established by controlling the flow regulator means in accordance with the control signal which is to minimize the static or differential pressure in each branch pipe. It has been found that this airflow Q' is about 20–40% smaller than the airflow Q set for the conventional pneumatic conveyor system. With this optimum airflow Q', the capacity of a blower may be correspondingly reduced, and as a result, power consumption may be saved by 20–40%.

According to the second embodiment of the present invention, the provision of the detectors in the branch pipes allows the system to immediately response to an abnormal state due to a temporary rise of mixing ratio which would otherwise cause choking of a pipe, thereby avoiding choking. Since the range of airflow regulated by the actuator between the maximum and the minimum flow rate positions is very wide and the response is quick and automatic, the system is highly reliable. The system can thus handle a variety of particulate solids varying in physical properties, for example, particle size and shape over a wide range. The range of mixing ratio which is allowable in the system also becomes wider.

The system of the present invention can automatically handle a wider range of particulate solids, providing the unexpected result that different types and amounts of particulate solids can be fed to the branch pipes of the system.

What I claim is:

1. In a pneumatic conveyor system comprising a plurality of substantially parallel transport pipes; and means for passing air through said transport pipes to transport particulate solids therethrough;
   the improvement comprising:
   air flow regulator means disposed in each of said transport pipes for maintaining the airflow through each respective transport pipe substantially constant;
   each of said transport pipes having a larger diameter portion, a smaller diameter portion and a converging portion connecting said larger and smaller diameter portions, said converging portion converging in the downstream direction of flow in said transport pipes; and
   each of said airflow regulator means including:
   a movable generally conical member movably mounted interior of the respective transport pipe in the vicinity of said converging portion so as to selectively cooperate with said converging portion to vary the airflow in said transport pipe, by varying the air flow area between said generally conical member and the inner walls of said converging portion;
   a first member coupled to said generally conical member and movably mounted interior of said transport pipe;
   a second member coupled to said first member for moving said first member relative to said transport pipe to thereby move said generally conical member relative to said converging portion of said transport pipe to set a given airflow in said transport pipe; and
   spring means coupling said generally conical member to said first member and biasing said generally conical member toward the upstream direction in said transport pipe such that said generally conical member, responsive to increased airflow in said transport pipe, is resiliently movable relative to said first member and against said biasing force in the downstream direction in said transport pipes to cooperate with said converging portion to reduce said airflow area in said transport pipe to thereby reduce the air flow in said transport pipe to thereby maintain said airflow in said transport pipe substantially constant.

2. The conveyor system of claim 1, wherein said second member comprises a means for providing a primary adjustment of said airflow in said transport pipe, said spring means providing a secondary, automatic adjustment of said airflow in said transport pipe.

3. The conveyor system of claim 2, wherein said generally conical member is slidably mounted at one end portion of said first member, said spring means being resiliently engageable between said first member and said generally conical member.

4. The conveyor system of claim 1, wherein said first member comprises a rod-shaped member slideably mounted interior of said transport pipe.

5. The conveyor system of claim 1, wherein said generally conical member is mounted with its conical portion within the confines of said converging portion.

6. The conveyor system of claim 1, wherein said first member comprises a rod-shaped member slidably mounted interior of said transport pipe; said generally conical member being slidably mounted at one end portion of said rod-shaped member; and said spring means being resiliently engaged between said end portion of said rod-shaped member and said generally conical member to bias said generally conical member in the upstream direction in said transport pipe.

7. The conveyor system of claim 6, wherein said second member is pivotally coupled to said rod-shaped member by means of a pin extending from said rod-shaped member and a slot formed in an end of said second member, said slot being slidably engaged with said pin; said second member extending through an opening in said transport pipe and being pivotable about said opening in said transport pipe to slideably move said rod-shaped member in said transport pipe to adjust said air flow in said transport pipe.

8. The conveyor system of claim 7, further comprising a scale cooperatively coupled to a portion of said second member located outside of said transport pipe to indicate the air flow set by said second member.

9. A pneumatic conveyor system comprising:
   a plurality of substantially parallel transport pipes,
   means for passing air through said transport pipes to transport particulate solids therethrough;
   a detector associated with each of said transport pipes for detecting at least one of a static pressure at a given point and a differential pressure at two points in the respective transport pipe, and for generating an output corresponding to said detected pressure;

control means coupled to said detector of each transport pipe and being responsive to said output of said detectors for developing a control signal having a value to minimize the detected static or differential pressure;

an actuator means coupled to said control means and being responsive to said control signal from said control means; and airflow regulator means disposed in each of said transport pipes and downstream of said detector and operatively coupled to said actuator so as to be controlled by said actuator such that said airflow regulator means is operated as a function of said control signal from said control means to regulate the air stream through said transport pipe to an optimum velocity;

each of said transport pipes having a larger diameter portion, a smaller diameter portion and a converging portion connecting said larger and smaller diameter portions, said converging portion converging in the downstream direction of flow in said transport pipes; and each of said airflow regular means including:
  a movable generally conical member movably mounted interior of the respective transport pipe in the vicinity of said converging portion so as to selectively cooperate with said converging portion to vary the airflow in said transport pipe, by varying the airflow area between said generally conical member and the inner walls of said converging portion;
  a first member coupled to said generally conical member and movably mounted interior of said transport pipe;
  a second member coupled to said actuator and to said first member for moving said first member relative to said transport pipe as a function of said control signal to thereby move said generally conical member relative to said converging portion of said transport pipe to set a given airflow in said transport pipe; and
  spring means coupling said generally conical member to said first member and biasing said generally conical member toward the upstream direction in said transport pipe such that said generally conical member, responsive to increased airflow in said transport pipe, is resiliently movable relative to said first member and against said biasing force in the downstream direction in said transport pipes to cooperate with said converging portion to reduce said airflow area in said transport pipe to thereby reduce the air flow in said transport pipe to thereby maintain said airflow in said said transport pipe substantially constant.

10. The conveyor system of claim 9, wherein said second member comprises a means for providing a primary adjustment of said airflow in said transport pipe, said spring means providing a secondary, automatic adjustment of said airflow in said transport pipe.

11. The conveyor system of claim 10, wherein said generally conical member is slidably mounted at one end portion of said first member, said spring means being resiliently engageable between said first member and said generally conical member.

12. The conveyor system of claim 9, wherein said first member comprises a rod-shaped member slidably mounted interior of said transport pipe.

13. The conveyor system of claim 9, wherein said generally conical member is mounted with its conical portion within the confines of said converging portion.

14. The conveyor system of claim 9, wherein said first member comprises a rod-shaped member slidably mounted interior of said transport pipe; said generally conical member being slidable mounted at one end portion of said rod-shaped member; and said spring means being resiliently engaged between said end portion of said rod-shaped member and said generally conical member to bias said generally conical member in the upstream direction in said transport pipe.

15. The conveyor system of claim 9, wherein said second member is pivotally coupled to said rod-shaped member by means of a pin extending from said rod-shaped member and a slot formed in an end of said second member, said slot being slidably engaged with said pin; said second member extending through an opening in said transport pipe and being pivotable about said opening in said transport pipe to slideably move said rod-shaped member in said transport pipe to adjust said air flow in said transport pipe.

16. The conveyor system of claim 15, further comprising a scale cooperatively coupled to a portion of said second member located outside of said transport pipe to indicate the air flow set by said second member.

* * * * *